United States Patent [19]
Kortmann

[11] Patent Number: 5,755,976
[45] Date of Patent: May 26, 1998

[54] PNEUMATIC BUBBLE AERATION REACTOR AND METHOD OF USING SAME

[76] Inventor: Robert W. Kortmann, 430 Talcott Hill Rd., Coventry, Conn. 06238

[21] Appl. No.: 747,642
[22] Filed: Nov. 13, 1996
[51] Int. Cl.[6] ..................................................... C02F 7/00
[52] U.S. Cl. .......................... 210/747; 210/137; 210/170; 210/194; 210/220; 210/242.2; 261/77
[58] Field of Search .................................... 210/137, 170, 210/220, 194, 242.2, 620, 621, 629, 747, 739, 758; 261/77

[56] References Cited

U.S. PATENT DOCUMENTS

| | | | |
|---|---|---|---|
| 3,419,493 | 12/1968 | Pangle, Jr. | 210/44 |
| 3,616,919 | 11/1971 | Fedders et al. | 210/169 |
| 3,643,403 | 2/1972 | Speece | 55/53 |
| 3,840,216 | 10/1974 | Smith et al. | 210/242.2 |
| 4,107,240 | 8/1978 | Verner et al. | 261/77 |
| 4,183,787 | 1/1980 | Roesler et al. | 435/43 |
| 4,253,949 | 3/1981 | Hines et al. | 210/194 |
| 4,259,267 | 3/1981 | Wang | 261/93 |
| 4,278,546 | 7/1981 | Roesler | 261/77 |
| 4,279,754 | 7/1981 | Pollock | 210/170 |
| 4,439,316 | 3/1984 | Kozima et al. | 210/194 |
| 4,507,253 | 3/1985 | Wiesmann | 261/22 |
| 4,549,997 | 10/1985 | Verner et al. | 261/77 |
| 4,724,086 | 2/1988 | Kortmann | 210/747 |
| 4,911,838 | 3/1990 | Tanaka | 210/242.2 |
| 5,043,104 | 8/1991 | Stirling | 261/77 |

FOREIGN PATENT DOCUMENTS

| | | |
|---|---|---|
| 54-70647 | 6/1979 | Japan. |
| 58-003-691 | 1/1983 | Japan. |
| 644291 | 1/1989 | Japan. |
| 1270-945-A | 2/1988 | U.S.S.R. |
| 8606712 | 11/1986 | WIPO. |

Primary Examiner—Christopher Upton
Attorney, Agent, or Firm—Alix, Yale & Ristas, LLP

[57] ABSTRACT

A pneumatic bubble aeration reactor and method for conditioning bodies of liquid comprising at least one upwelling bubble conduit, at least one return conduit fluidly connected to the upwelling conduit via a fluid reservoir and a secondary gas-diffuser positioned adjacent the top of the return conduit. A liquid driving diffuser introduces oxygen-rich gas bubbles into the upwelling conduit at a velocity sufficient to cause the downward flowing liquid in the return conduit to exceed the natural tendency of the secondary gas to flow upwardly. This driving action is coupled with a reactor geometry to assure a liquid velocity that exceeds the rise velocity of the bubbles, causing the bubbles to reach the exit end of the return conduit. An expansion chamber is provided at the exit end of the return conduit to present a decreasing velocity gradient to the fluid passing through the return conduit. This expansion chamber increases the gas bubble dwell time and allows for recirculation of the gas bubbles from the return conduit into the upwelling conduit. A counter-flow of gas bubbles can also be introduced into the return conduit proximate the exit end thereof. Due to prolonged exposure between the liquid and the gas bubbles within both the upwelling and return conduits, high oxygen absorption efficiency is attained.

21 Claims, 3 Drawing Sheets

1

PNEUMATIC BUBBLE AERATION REACTOR AND METHOD OF USING SAME

BACKGROUND OF THE INVENTION

1. Field of the Invention

The present invention relates to the conditioning of liquid bodies, and especially deep water bodies such as lakes, reservoirs and ponds. More particularly, the present invention is directed to a novel and improved bubble aeration reactor and method for adjustably manipulating the oxygen content of such a liquid body.

2. Description of the Related Art

Heretofore various devices have been employed for oxygenating water bodies, as more fully described in the Verner et al U.S. Pat. Nos. 4,107,240 and 4,549,997 and the Kortmann U.S. Pat. No. 4,724,086, the contents of which are incorporated herein by reference.

These aeration reactors typically comprise a liquid intake upwelling conduit such as a vertically disposed upwelling bubble chamber or conduit, and an outboard reverse flow return conduit with an intermediate reservoir fluidly interconnecting the conduits at their uppermost ends by a reservoir. A gas bubble diffuser is typically located adjacent the lower open end of the upwelling conduit to introduce gas bubbles thereto and thereby impart an upwelling driving force component to the liquid within the bubble chamber. This in turn causes water to enter the lower end of upwelling conduit and to pass upwardly therethrough toward the reservoir while in intimate contact with the gas bubbles. The water and gas bubbles within the reservoir then flow downwardly through the return conduit and exit into the water body.

As shown in the aforementioned U.S. Pat. No. 4,549,997, a second gas bubble diffuser may be positioned in the return conduit to provide a counterflow to the direction of the water passing downwardly through the return conduit. These upwardly flowing gas bubbles contact the water flowing downwardly and cause further oxygenation of the water flow. The Weismann U.S. Pat. No. 4,507,253 also describes a counterflow aeration system of differing design.

Some prior art devices do not employ an upwelling bubble chamber but instead employ an impeller to drive the liquid downwardly while effecting aeration. The Speece U.S. Pat. No. 3,643,403 as well as the Wang U.S. Pat. No. 4,259,267 employ such a system with a diverging funnel-shaped column housing the impeller and air injector. The Stirling U.S. Pat. No. 5,043,104 describes a similar operation with an impeller located at the bottom of the column whereby the impeller-driven flow of the liquid draws the bubbles down through the column.

SUMMARY OF THE INVENTION

It is an object of the present invention to provide a new and improved pneumatic bubble aeration reactor and method to more efficiently accomplish the aeration process and improve the quality of liquid bodies of the nature discussed above. Included in this object is the provision for an impeller-free pneumatic bubble aeration reactor and method, for alleviating water quality problems caused by deleterious accumulations within those liquid bodies.

An additional object of the present invention is to provide a new and improved pneumatic aeration reactor and method for improving the quality of liquid bodies which offer an optimal combination of (1) simplicity; (2) reliability; (3) versatility; and (4) economy. Included in this object is the provision for a system that relies solely upon gas injection not only for aeration but also for efficient and facile actuation, operation and control.

Numerous other objects and advantages of the present invention will be in part obvious and in part pointed out more in detail hereinafter.

These and related objects and advantages of the present invention are achieved by providing a pneumatic bubble aeration reactor for conditioning bodies of liquid comprising at least one upwelling bubble chamber or conduit and at least one return conduit that includes a gas-diffusing aerator at the top of the return conduit. Unlike the prior bubble aeration reactors described above, gas bubbles introduced at the top of the return conduit are driven downwardly by the liquid flow in counterbalance to the natural tendency of the gas to flow upwardly. This driving action is coupled with a reactor geometry, particularly in the return conduit to assure a liquid velocity that exceeds the rise velocity of the bubbles, causing the bubbles to reach the lower end of the return conduit. The gas bubbles may either be allowed to escape into the liquid body or may be recirculated into the upwelling conduit. Due to prolonged exposure between the liquid and the gas bubbles within both the upwelling and return conduits, high oxygen absorption efficiency is attained. Thus, the liquid reentering the liquid body is enriched with a significant amount of oxygen dissolved therein.

As an additional feature to the above-discussed pneumatic bubble aeration reactor, the lower end of the return conduit can be provided with an expansion chamber. The expansion chamber is fluidly connected to the liquid body so that liquid flowing through the return conduit can pass therethrough before being discharged into the liquid body. Both the return conduit and the expansion chamber preferably define constant cross-sectional areas along the respective lengths thereof. The area of the expansion chamber is larger than that of the return conduit. This configuration permits the liquid/gas flow to expand and presents a decreasing velocity gradient to the liquid and gas bubbles as they enter the expansion chamber. This, in turn, increases oxygen absorption efficiency by increasing the dwell time of the liquid passing through the return conduit and further provides for recirculation of the gas bubbles from the return conduit into the upwelling conduit. Such gas bubble recirculation enhances gas absorption in the upwelling conduit and improves efficiency of operation due to the increased presence of gas bubbles therein.

Yet another feature of the present invention includes the addition of a third gas bubble diffuser located proximate the lower end of the return conduit for introduction of oxygen-rich gas bubbles which flow counter to the flow of the liquid/bubble stream in the return conduit. By appropriately selecting the size and geometry of the various reactor components, as well as by regulating the introduction of gas bubbles by the first, second and third diffusers, contact between the gas bubbles and the flowing liquid can be maximized. This increase in gas bubble/liquid contact leads to a concomitant increase in absorption efficiency.

The invention accordingly consists in the feature of construction, combination of elements and arrangement of parts which will be exemplified in the construction hereinafter set forth in the drawings and the following detailed disclosure.

DESCRIPTION OF THE PREFERRED EMBODIMENTS

Figure 1:
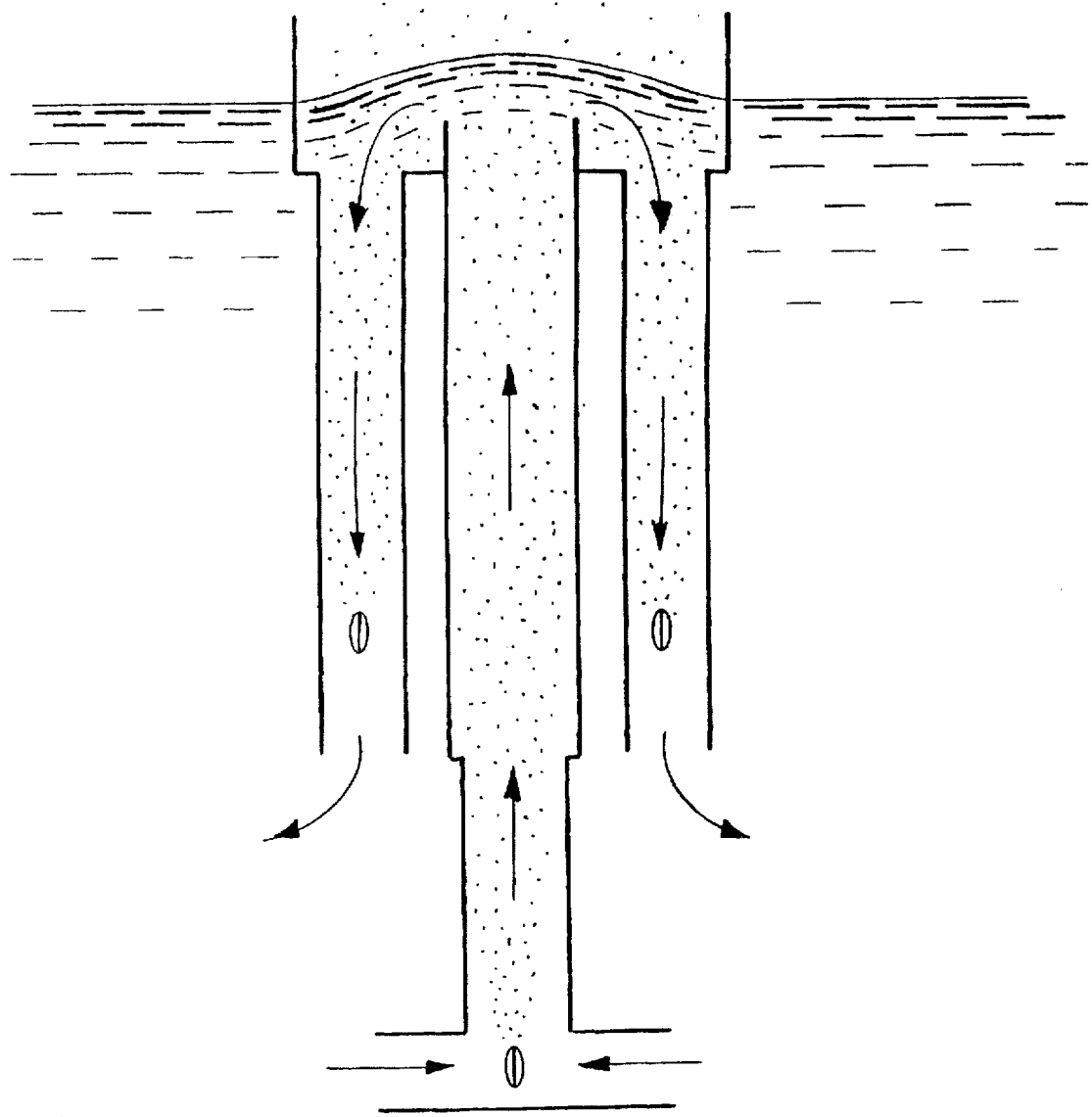
FIG. 1 is a schematic representation of a pneumatic bubble aeration reactor typical of the prior art.

Although specific forms of the invention have been selected for illustration in the drawings, and the following description is drawn in specific terms for the purpose of describing these forms of the invention, this description is not intended to limit the scope of the invention.

Figure 2:
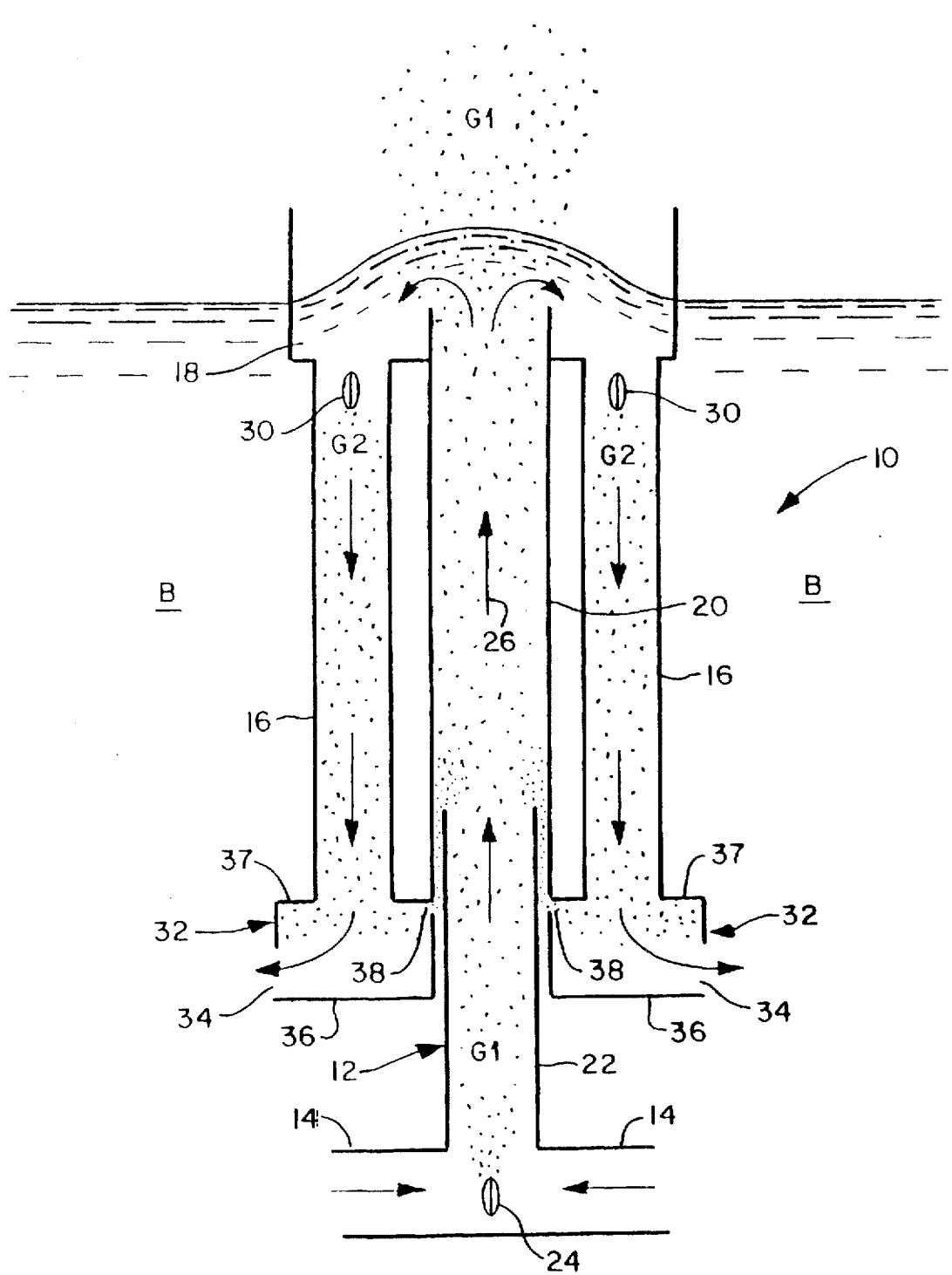
FIG. 2 is a schematic representation of a pneumatic bubble aeration reactor incorporating the features in accordance with a preferred embodiment of the present invention.

Referring now in greater detail to the drawings wherein like reference numerals indicate like parts, a first embodiment of the pneumatic bubble aeration reactor of the present invention is shown in FIG. 2 and designated generally by the numeral 10. It should be appreciated that the figures are greatly simplified schematic representations of the aeration reactor, which is shown as being disposed within a water body B adjacent the surface thereof. As shown in FIG. 2, reactor 10 comprises at least one central upwelling bubble chamber or conduit 12 which is adapted for generally vertical disposition within the water body B. Upwelling chamber 12 has one or more inlet ports 14 on the lower end thereof which fluidly communicate with the water body B to permit intake of water therefrom. Reactor 10 further comprises at least one return conduit 16 outboard of the upwelling chamber 12. The return conduit 16 fluidly communicates with chamber 12 at its uppermost end by a reservoir 18 positioned at the surface of water body B and open to the atmosphere above that surface.

As shown, upwelling bubble chamber 12 may be adjustable in length as a result of a telescoping tubular array consisting of a fixed conduit portion 20 secured to the reservoir 18 and a telescoping lower portion 22 movable relative to the fixed portion. The lower portion 22 carries the inlet ports 14 whereby movement thereof can adjust the position of the ports 14 relative to the discharge from the return conduit 16. Of course, it will be appreciated that the bubble chamber may be of fixed length while the return conduit is adjustable. As shown, the cross-section of return conduit 16 is substantially constant along the fixed length thereof.

Reactor 10 is further provided with a first diffuser 24 mounted in the telescoping lower portion 22 of the bubble chamber adjacent the inlet ports 14. The diffuser 24 is operatively connected to a source (not shown) of oxygen-rich gas for introducing the initial gas bubbles G1 into the upwelling bubble chamber 12 with an upward velocity to thereby cause water in the chamber to flow upwardly within upwelling conduit 12 as indicated by the arrows 26. When the upwardly flowing water and gas bubbles G1 reach the upper end of upwelling conduit 12, they tend to disperse within the reservoir 18 and excess gas bubbles are permitted to escape into the ambient atmosphere. The water, under the driving force of diffuser 24, flows toward and downwardly through return conduit 16, the downwardly flowing water eventually reentering water body B at a location remote from the intake ports 14.

In accordance with the invention, a second diffuser 30 is provided within return conduit 16, second diffuser 30 being preferably disposed proximate the reservoir but preferably within the return conduit 16. The second diffuser 30 injects a secondary oxygen-rich gas bubble charge into the return conduit 16. This causes the secondary gas bubbles G2 to intermix with the downwardly flowing water from reservoir 18. However, the downward driving force to the water within the return conduit 16 exceeds the rise velocity of the bubbles G2, forcing them toward the lower end of the conduit.

As shown in FIG. 2, the lower discharge end of the return conduit 16 directly communicates with an expansion chamber 32 that defines a region with an increased cross-sectional area relative to the cross-sectional area of return conduit 16. While the cross-sectional area of expansion chamber 32 may vary along the length thereof, it is preferably constant. The chamber 32 is provided with a discharge port 34 adjacent the bottom 36 of the chamber for permitting fluid return flow to the water body B. This expanded area permits dispersion of the downwardly flowing gas bubbles G2 and water exiting the return conduit 16 and thereby results in a decrease in the flow velocity through expansion chamber 32. By appropriately selecting the size and geometry of the various components of the reactor and by regulating the introduction of gas bubbles G1 and G2, the water which travels into expansion chamber 32 can be slowed within expansion chamber 32 to the point where the upward buoyant velocity of gas bubbles G2 is virtually equal to the downward velocity of the water flowing therethrough. The chamber 32 is further provided with a gas bubble-collecting top shelf or roof 37 where gas bubbles G2 may accumulate for prolonging their contact with the water travelling through the chamber 32 and provide more efficient gas absorption.

The expansion chamber 32 is further provided with circulation opening 38 adjacent the top shelf 37 thereof. The opening 38 advantageously provides communication with the telescopic bubble chamber 12 such that accumulated gas bubbles G2 which do not dissolve in the water flowing through the chamber 32 are allowed to pass into upwelling conduit 12 to cause further oxygenation of the upwardly flowing water within upwelling conduit 12 as a supplement to the initial gas bubbles G1.

As will be readily appreciated, the above-described pneumatic bubble aeration reactor offers improved oxygen absorption efficiency due to, inter alia, the increased contact and dwell time between the gas bubbles and the liquid as they circulate through the system and before the liquid is discharged through the port 34 of the expansion chamber 32. Additionally, since the water is preferably driven through the reactor 10 exclusively by use of the pneumatic diffuser 24, absorption efficiency is increased relative to aeration reactors which rely on other water circulating means such as pumps and impellers. It will further be appreciated that, in normal usage, the intake and discharge port locations can be adjusted for operation at various depths of the water body.

In addition to providing for aeration of the water passing therethrough, this arrangement may provide for modifying any stratification of water body B because of the exchange of water from one layer to another as more fully explained in U.S. Pat. No. 4,724,086. For example, the inlet ports 14 of upwelling conduit 12 could be disposed in the hypolimnion layer and the discharge port 34 of the expansion chamber 32 could be disposed in the metalimnion layer.

Figure 3:
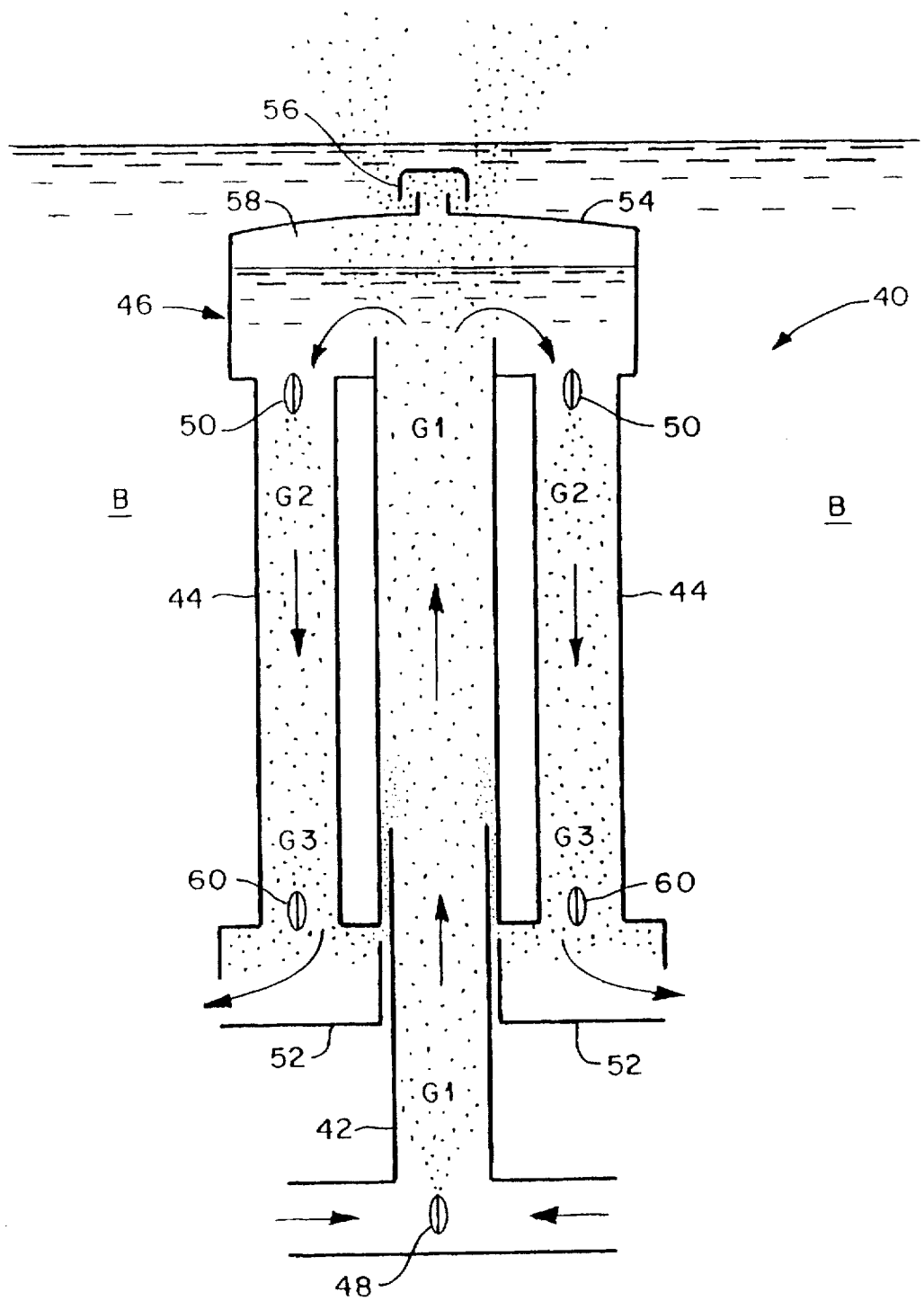
FIG. 3 is a schematic representation of another embodiment of the pneumatic bubble aeration reactor of the present invention.

Turning now to FIG. 3, there is depicted another embodiment of the pneumatic bubble aeration reactor of the present invention. It will be appreciated that FIG. 3 is a greatly simplified schematic representation of the reactor. As shown in FIG. 3, reactor 40 is generally vertically disposed within water body B and comprises an upwelling conduit 42, a return conduit 44, a reservoir 46 therebetween, first and second diffusers 48, 50 and an expansion chamber 52, all substantially comparable to the similar components described in connection with the embodiment of FIG. 2.

Further, as shown in FIG. 3, the reservoir 46 of the reactor 40 may employ a fully submersible configuration which is entirely submerged within water body B. In order to prevent inflow of water from water body B directly into the reservoir 46, it is provided with an enclosing dome-like cover 54 fitted with a pressure relief assembly 56. Reservoir 40, thus, generally defines an enclosed interior chamber 58. The upper portion of the chamber contains gas, i.e., air or oxygen, which typically will be a collection of escaped gas bubbles. As can be seen from FIG. 3, a pressure relief assembly 56 may be positioned in the dome-shaped cover 54 for controlled release of gas build-up within reservoir chamber 58. For example, the relief assembly 56 may be positioned at the apex of the cover 54, as shown. A vent pipe or comparable member may be provided to extend from the upper portion of reservoir cover 54 to the surface of water body B, as a substitute for pressure relief assembly 56, to limit the volume of the trapped gas in reservoir chamber 58. Naturally, the presence of a substantial amount of gas within chamber 58 will tend to maintain the reactor 40 in a substantially vertical orientation while the reactor itself is anchored in position.

Additionally, a third diffuser 60 is provided in the return conduit 44 immediately upstream of the expansion chamber 52. Diffuser 60 introduces a tertiary supply of oxygen-rich gas bubbles, G3, into return conduit 44 as a counterflow to the liquid traveling along the return conduit 44. The counterflow of gas bubbles G3 relative to gas bubbles G2 and the downwardly-flowing water within the return conduit allows for prolonged dwell time of the water passing through the return conduit. Additionally, the decrease in velocity incident to the use of expansion chamber 52, as described above with respect to FIG. 2, assists in ensuring that the velocity with which gas bubbles G2 and G3 flow through the expansion chamber 52 approaches zero, thereby permitting efficient circulation of the gas. By appropriately selecting the size and geometry of the various components of reactor 40 as well as by regulating the introduction of gas bubbles G1, G2 and G3, for example, by causing the down flow water velocity to be slightly less than the bubble rise velocity for bubbles G3, oxygen absorption into the water flowing through reactor 40 can be maximized, i.e., oxygen absorption efficiency is maximized.

Reactor 40 can, alternatively, include a number of optional features. Firstly, expansion chamber 52 may, but need not, be provided with a circulation opening, similar to that of opening 38 of expansion chamber 32 shown in FIG. 2, to allow gas bubbles G2 and G3 to enter upwelling conduit 42. Secondly, second and third diffusers 50 and 60 could, alternatively, be relocated to ensure maximum dwell time within the water passing through the reactor 40. For example, diffuser 50 could be disposed either within reservoir 46 or somewhere along the length of return conduit 44. Additionally, diffuser 60 could, alternatively, be disposed either within a central region of return conduit 44 or within expansion chamber 52. The velocity of gas bubbles G2 and G3 introduced by diffusers 50 and 60 could be regulated, as mentioned, to allow at least some of gas bubbles G2 and G3 to flow upwardly through reservoir 46 and escape. Such an arrangement would, optimally, allow for additional aeration to occur within reservoir 46. Finally, reactor 40 could also include any one or more of the optional features described above with respect to the embodiment of FIG. 2.

As will be apparent to persons skilled in the art, various modifications and adaptations to the apparatus and method described above will become readily apparent without departure from the spirit and scope of the invention.

I claim:

1. An apparatus for conditioning a body of liquid comprising:

at least one upwelling conduit adapted for immersion within said liquid body, said upwelling conduit having liquid intake means for drawing liquid from said liquid body;

at least one return conduit adapted for immersion within said liquid body, said return conduit having liquid discharge means for returning liquid to said liquid body;

a reservoir fluidly connecting said upwelling and return conduits for transfer of fluids therebetween, said reservoir being spaced from said liquid intake and discharge means;

first gas diffuser means for diffusing gas bubbles into said upwelling conduit to cause liquid from the liquid body to flow along said upwelling conduit toward said reservoir; and second gas diffuser means for diffusing gas bubbles into said return conduit adjacent the top thereof, said first diffuser means being effective to develop a liquid flow in the return conduit that exceeds the rise velocity of the gas bubbles from said second diffuser means.

2. The apparatus of claim 1, including an expansion chamber adjacent said liquid discharge means, said expansion chamber being larger in cross-section than said return conduit to thereby cause the gas bubbles and liquid flowing through said return conduit to flow with decreasing velocity upon reaching said expansion chamber.

3. The apparatus of claim 2, wherein said expansion chamber includes gas recycling means operatively connecting said chamber to said upwelling conduit to permit recycling of at least some of said gas bubbles within said chamber.

4. The apparatus of claim 3, further comprising third gas diffuser means for diffusing gas bubbles into said return conduit with a velocity sufficient to provide a bubble counter flow to the liquid flowing through said return conduit.

5. The apparatus of claim 1, further comprising third gas diffuser means for diffusing gas bubbles into said return conduit with a velocity sufficient to provide a bubble counter flow to the liquid flowing through said return conduit.

6. The apparatus of claim 5, including means for controlling the liquid-gas dwell time within said return conduit by varying at least one of (a) the upward velocity of the gas bubbles diffused into said upwelling conduit by said first diffuser means and; (b) the upward velocity of the gas bubbles diffused into said return conduit by said third diffuser means.

7. The apparatus of claim 1, including means for controlling the liquid/gas dwell time within said return conduit.

8. The apparatus of claim 7, wherein said reservoir comprises a fully submersible housing forming an enclosed interior chamber having an upper portion for containing gas and a lower portion for containing liquid so as to provide a gaseous-liquid interface, said lower portion being fluidly connected to said upwelling and return conduits.

9. The apparatus of claim 1, wherein said reservoir comprises a fully submersible housing forming an enclosed interior chamber having an upper portion for containing gas and a lower portion for containing liquid so as to provide a gaseous-liquid interface, said lower portion being fluidly connected to said upwelling and return conduits.

10. An apparatus for conditioning a body of liquid comprising:
   at least one upwelling conduit adapted for immersion within said liquid body, said upwelling conduit having liquid intake means for drawing liquid from said liquid body;
   at least one return conduit adapted for immersion within said liquid body, said return conduit being effective for returning liquid to said liquid body;
   a reservoir fluidly connecting said upwelling and return conduits for transfer of fluids therebetween, said reservoir being spaced from said liquid intake means;
   first gas injection means for injecting gas bubbles into said upwelling conduit to cause liquid from said liquid body to flow along said upwelling conduit toward said reservoir;
   second gas injection means for injecting gas bubbles into said return conduit to cause said gas bubbles to flow along said return conduit; and
   an expansion chamber downstream of said return conduit, said expansion chamber having a liquid discharge port and gas recirculating means, said chamber fluidly connecting said return conduit to said discharge port to permit at least some of the liquid flowing through said return conduit to discharge into said liquid body and said gas recirculating means providing for at least some of the gas bubbles flowing through the return conduit to flow into said upwelling conduit.

11. The apparatus of claim 10, wherein said return conduit and said expansion chamber define substantially constant cross-sections, and wherein said expansion chamber is larger in cross-section than said return conduit whereby the liquid and gas bubbles flowing through said return conduit flow with decreased velocity upon entry into said expansion chamber.

12. The apparatus of claim 10, wherein said return conduit has an upper end positioned adjacent said reservoir and said second gas injection means injects gas bubbles into said return conduit at said upper end.

13. The apparatus of claim 10, wherein said reservoir comprises a fully submersible housing forming an enclosed interior chamber having an upper portion for containing gas and a lower portion for containing liquid so as to provide a gas-contacting liquid surface therein, said lower portion being operatively connected to said upwelling and return conduits for forming a fluid flow path therebetween.

14. The apparatus of claim 10, further comprising third gas injection means for injecting oxygen-rich gas bubbles into said return conduit in counter flow to liquid flow therethrough.

15. A method of conditioning a body of liquid with a liquid circulating apparatus of a type having upwelling and return conduits fluidly connected to the liquid body, and a reservoir operatively interconnecting said conduits, said method comprising the steps of:
   injecting oxygen-rich gas bubbles into the lower end of the upwelling conduit to cause the liquid therein to upwell within the conduit toward the reservoir and to draw liquid into the conduit from said liquid body and
   injecting oxygen-rich gas bubbles into the top of the return conduit, the injection into the upwelling conduit proving a liquid velocity in the return conduit that exceeds the rise velocity of the bubbles injected into the return conduit.

16. The method of claim 15, further comprising the step of decreasing the velocity of the downwardly flowing liquid and gas bubbles prior to return of the liquid to said liquid body.

17. The method of claim 16 wherein the velocity is decreased by at least temporarily collecting the downward flow within an expansion zone.

18. The method of claim 15 including the step of accumulating a portion of the gas bubbles exiting the return conduit and separating the accumulated portion from the liquid returned to said liquid body.

19. The method of claim 15, further comprising the step of circulating into the upwelling conduit at least some of the downwardly flowing gas bubbles in the return conduit.

20. The method of claim 15, further comprising the step of injecting oxygen-rich gas bubbles into the lower end of the return conduit with an upward velocity to provide a counterflow of gas bubbles to the liquid flowing along the return conduit.

21. The method of claim 15, further comprising the steps of injecting oxygen-rich gas bubbles into the lower end of the return conduit, and controlling the velocity of the downwardly flowing liquid in the return conduit by controlling the injection of at least one of the gas bubbles injected into (a) the upwelling conduit; and (b) the lower end of the return conduit.

* * * * *